United States Patent
Choi et al.

(10) Patent No.: US 9,862,343 B2
(45) Date of Patent: Jan. 9, 2018

(54) METHOD FOR CONTROLLING PASSENGER AIRBAG AND PASSENGER AIRBAG SYSTEM USING THE SAME

(71) Applicants: Hyundai Motor Company, Seoul (KR); Kia Motors Corp., Seoul (KR)

(72) Inventors: Jun Yeol Choi, Seoul (KR); Hyo Shub Shin, Seoul (KR); Kyung Taek Lim, Seoul (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 159 days.

(21) Appl. No.: 14/946,581

(22) Filed: Nov. 19, 2015

(65) Prior Publication Data

US 2017/0057444 A1 Mar. 2, 2017

(30) Foreign Application Priority Data

Aug. 27, 2015 (KR) .................. 10-2015-0120840

(51) Int. Cl.
*B60R 21/015* (2006.01)
*B60R 21/0132* (2006.01)
(Continued)

(52) U.S. Cl.
CPC .... *B60R 21/01512* (2014.10); *B60R 21/0132* (2013.01); *B60R 21/0134* (2013.01);
(Continued)

(58) Field of Classification Search
CPC ........... B60R 21/0512; B60R 21/0132; B60R 21/01546; B60R 21/0134;
(Continued)

(56) References Cited

U.S. PATENT DOCUMENTS 8,393,638 B2* 3/2013 Gottschalk ............ B60R 21/206
280/730.1
9,650,006 B2* 5/2017 Foo ..................... B60R 21/0132
(Continued)

FOREIGN PATENT DOCUMENTS

JP 11-43002 A 2/1999
JP 2001-55108 A 2/2001
(Continued)

OTHER PUBLICATIONS

Kim et al. KR 2012 0011724 English Translation, ip.com.*

*Primary Examiner* — Karen Beck
(74) *Attorney, Agent, or Firm* — Morgan, Lewis & Bockius LLP

(57) ABSTRACT

A method for controlling a passenger airbag may include determining whether an occupant is present on a passenger seat; determining whether the occupant seated on the passenger seat has fastened a safety belt; determining whether deployment of a passenger airbag is required; and deploying, when the deployment of the passenger airbag is required, a main chamber of the passenger airbag, and further deploying a sub-chamber connected to the main chamber of the passenger airbag to be interlocked with the deployment of the main chamber when the occupant is present on the passenger seat and has fastened the safety belt.

10 Claims, 6 Drawing Sheets

(51) Int. Cl.
  *B60R 21/0134* (2006.01)
  *B60R 21/01* (2006.01)
(52) U.S. Cl.
  CPC .............. *B60R 21/01546* (2014.10); *B60R 2021/01211* (2013.01); *B60R 2021/01225* (2013.01); *B60R 2021/01245* (2013.01)
(58) Field of Classification Search
  CPC . B60R 2021/01211; B60R 2021/01245; B60R 2021/01225
  See application file for complete search history.

(56) References Cited

U.S. PATENT DOCUMENTS

| | | | | |
|---|---|---|---|---|
| 2007/0257473 | A1* | 11/2007 | Choi | B60R 21/0136 280/735 |
| 2010/0138113 | A1* | 6/2010 | Lee | B60Q 9/00 701/45 |
| 2015/0112552 | A1* | 4/2015 | Okamura | B60R 21/0132 701/45 |
| 2015/0266439 | A1* | 9/2015 | Foo | B60R 21/0132 701/45 |
| 2015/0274110 | A1* | 10/2015 | Ishida | B60R 21/01512 280/729 |
| 2015/0274116 | A1* | 10/2015 | Jaradi | B60R 21/0136 701/45 |
| 2016/0137153 | A1* | 5/2016 | Kim | B60R 21/263 280/734 |

FOREIGN PATENT DOCUMENTS

| | | |
|---|---|---|
| JP | 2006-224776 A | 8/2006 |
| JP | 2015-113027 A | 6/2015 |
| KR | 10-0797134 B1 | 1/2008 |
| KR | 10-2010-0119671 A | 11/2010 |
| KR | 10-2012-0011724 A | 2/2012 |

* cited by examiner

METHOD FOR CONTROLLING PASSENGER AIRBAG AND PASSENGER AIRBAG SYSTEM USING THE SAME

CROSS REFERENCE TO RELATED APPLICATION

The present application claims priority to Korean Patent Application No. 10-2015-0120840, filed Aug. 27, 2015, the entire contents of which is incorporated herein for all purposes by this reference.

BACKGROUND OF THE INVENTION

Field of the Invention

The present invention relates to a method for controlling a main chamber and a sub-chamber of a passenger airbag and a passenger airbag system using the same.

Description of Related Art

An airbag is an occupant protection device which prevents an occupant of a vehicle from directly colliding with a hard structure of a vehicle body when a vehicle collision occurs and thus secures the safety of the occupant. As the technology pertaining to airbags is gradually developed from an initial stage in which an airbag is simply deployed in front of an occupant to protect the occupant, various types of airbags, e.g., a roof airbag and a curtain airbag, configured such that airbags can be deployed not only from the front but also from various other directions have been introduced. In addition, techniques for controlling pressure and timing at which each airbag is deployed depending on conditions of a vehicle collision were introduced to more reliably secure the safety of occupants.

An research moving deformable barrier (RMDB) collision test item is one of vehicle collision test items which are recently added. This is to simulate collision conditions including not only frontal or side collision conditions but also conditions which are more similar to those in a real crash situation. For example, the RMDB collision test item may include a collision test in which a vehicle collides with a barrier at a speed of 90 km/h at an angle of about 15° from the front of the vehicle body.

In the case of an airbag control method and system according to a conventional technique, one of the most significant problems caused when an RMDB collision occurs is that the occupant on the passenger seat comes into hard contact with a vehicle body. In detail, in the case where a three-point fixed safety belt is used as the safety belt of the passenger seat, when the occupant on the passenger seat is leaned forward by a collision, only one shoulder of the occupant is fixed in place by the safety belt, and thus the upper body of the occupant is biased in the direction pertaining to the other unfixed shoulder. In this case, the occupant may be displaced out of a range within which a main chamber of the passenger airbag can protect the occupant, and be brought into hard contact with a center fascia of the vehicle rather than being protected by the airbag.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling a passenger airbag to secure the safety of an occupant seated on a passenger seat when an oblique collision occurs.

According to one aspect, there is provided a method for controlling a passenger airbag, including: determining whether an occupant is present on a passenger seat; determining whether the occupant seated on the passenger seat has fastened a safety belt; determining whether deployment of a passenger airbag is required; and deploying, when the deployment of the passenger airbag is required, a main chamber of the passenger airbag, and also deploying a sub-chamber connected to the main chamber of the passenger airbag to be interlocked with the deployment of the main chamber if the occupant is present on the passenger seat and has fastened the safety belt.

The determining of whether the deployment is required may include determining a collision speed of a vehicle, and determining whether a collision is a high-speed collision or a low-speed collision. The deploying may include deploying the main chamber of the passenger airbag at a high pressure when the collision is determined as being the high-speed collision, and deploying the main chamber of the passenger airbag at a low pressure when the collision is determined as being the low-speed collision.

In the deploying, when the deployment of the passenger airbag is required, if no occupant is present on the passenger seat, the passenger airbag may not be operated.

In the deploying, when the deployment of the passenger airbag is required, if the occupant is present on the passenger seat and has not fastened the safety belt, the main chamber of the passenger airbag may be deployed and the sub-chamber may not be deployed.

In the deploying, when the deployment of the passenger airbag is required, if the occupant is present on the passenger seat and has not fastened the safety belt and the collision is determined as being the low-speed collision, the main chamber of the passenger airbag may be deployed at a low pressure and the sub-chamber may be deployed.

The main chamber may be deployed by two stages of explosion of an inflator which are selectively conducted. The deploying may include deploying the sub-chamber to be interlocked with a first explosion timing of the inflator of the main chamber.

The method may further include, after the determining of whether the deployment is required, determining whether a collision pertains to a first mode or a second mode using an acceleration value of pulse detected when the collision occurs.

According to another aspect, there is provided a method for controlling a passenger airbag, including: determining, by a control unit, i.e., a controller, whether an occupant is present on a passenger seat using an occupant detection sensor; determining, by the control unit, whether the occupant seated on the passenger seat has fastened a safety belt using a belt fastening detection sensor; determining, by the control unit, whether deployment of the passenger airbag is required depending on a value measured by a collision sensor or a result of collision prediction using a pre-crash system; and controlling, by the control unit, when the deployment of the passenger airbag is required, operation of an inflator of the passenger airbag and deploying a main chamber of the passenger airbag, and also deploying a sub-chamber connected to the main chamber of the passenger airbag to be interlocked with the deployment of the main chamber if the occupant is present on the passenger seat and has fastened the safety belt.

The main chamber and the sub-chamber may be configured to communicate with each other when an actuator is operated. The deploying of the sub-chamber may include operating the actuator to be interlocked with the controlling of the operation of the inflator.

According to a further aspect, there is provided a passenger airbag system for conducting the passenger airbag control method, the passenger airbag system including: an occupant detection sensor detecting whether an occupant is present on a passenger seat; a belt fastening detection sensor detecting whether the occupant has fastened a safety belt; a collision sensor detecting a collision of a vehicle; a main chamber provided in front of the occupant seated on the passenger seat; a sub-chamber connected to the main chamber; and a control unit, i.e., a controller, controlling the main chamber and the sub-chamber such that when a collision signal is detected, the main chamber of the passenger airbag is deployed, and the sub-chamber connected to the main chamber is also deployed to be interlocked with the deployment of the main chamber if the occupant is present on the passenger seat and has fastened the safety belt.

According to a further aspect, there is provided a passenger airbag system for conducting the passenger airbag control method, the passenger airbag system including: an occupant detection sensor detecting whether an occupant is present on a passenger seat; a belt fastening detection sensor detecting whether the occupant has fastened a safety belt; a pre-crash system predicting a collision with another vehicle; a main chamber provided in front of the occupant seated on the passenger seat; a sub-chamber connected to the main chamber; and a control unit, i.e., a controller, controlling the main chamber and the sub-chamber such that when the collision with the another vehicle is predicted by the pre-crash system, the main chamber of the passenger airbag is deployed, and the sub-chamber connected to the main chamber is also deployed to be interlocked with the deployment of the main chamber if the occupant is present on the passenger seat and has fastened the safety belt.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
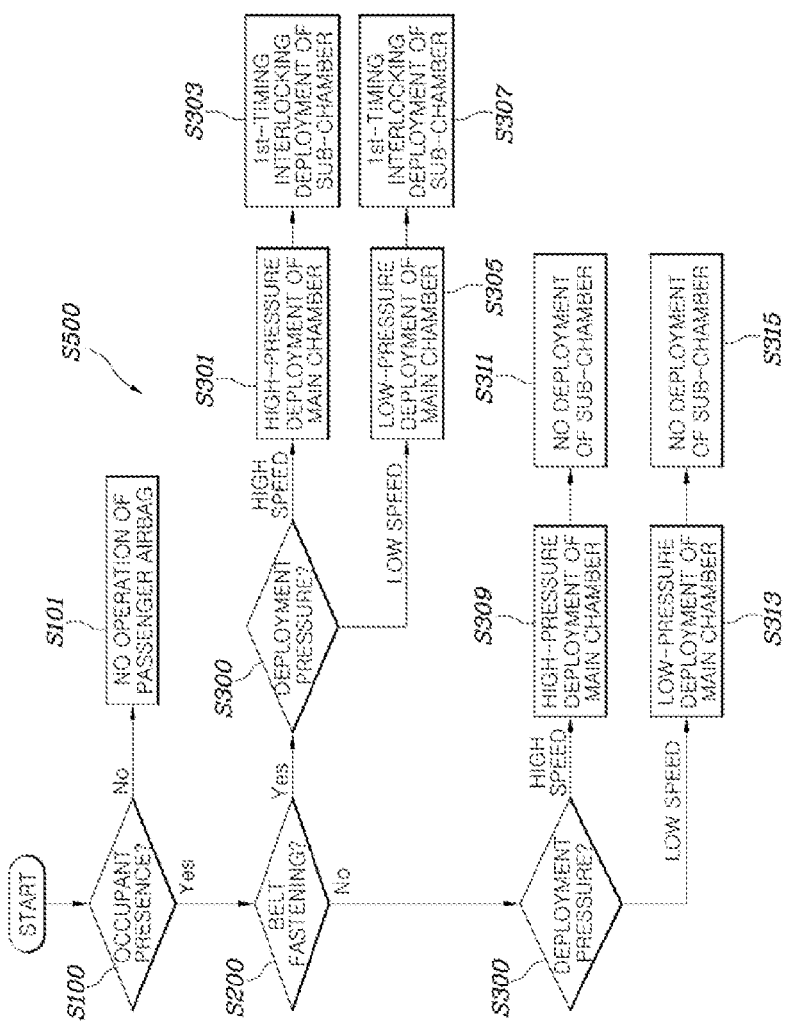
FIG. 1 is a flowchart showing a method for controlling a passenger airbag according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described with reference to the attached drawings.

Figure 2:
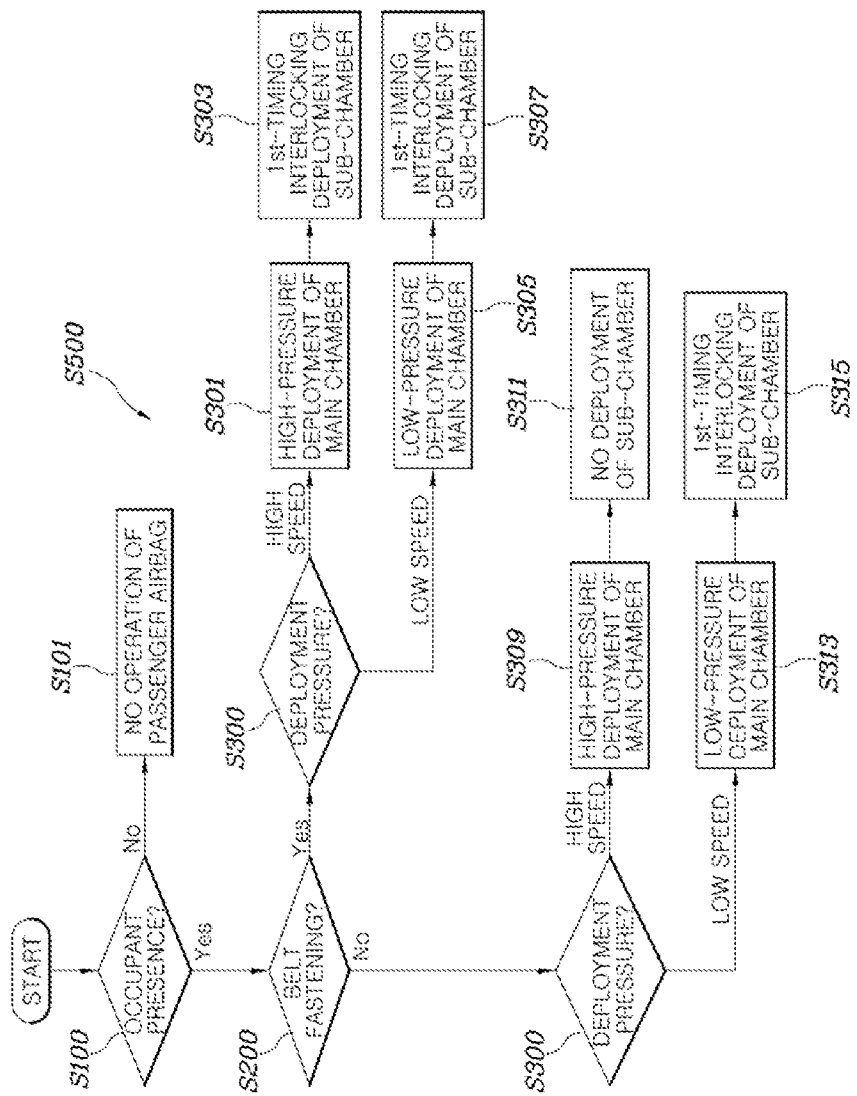
FIG. 2 is a flowchart showing a method for controlling a passenger airbag according to another embodiment of the present invention.
Figure 3:
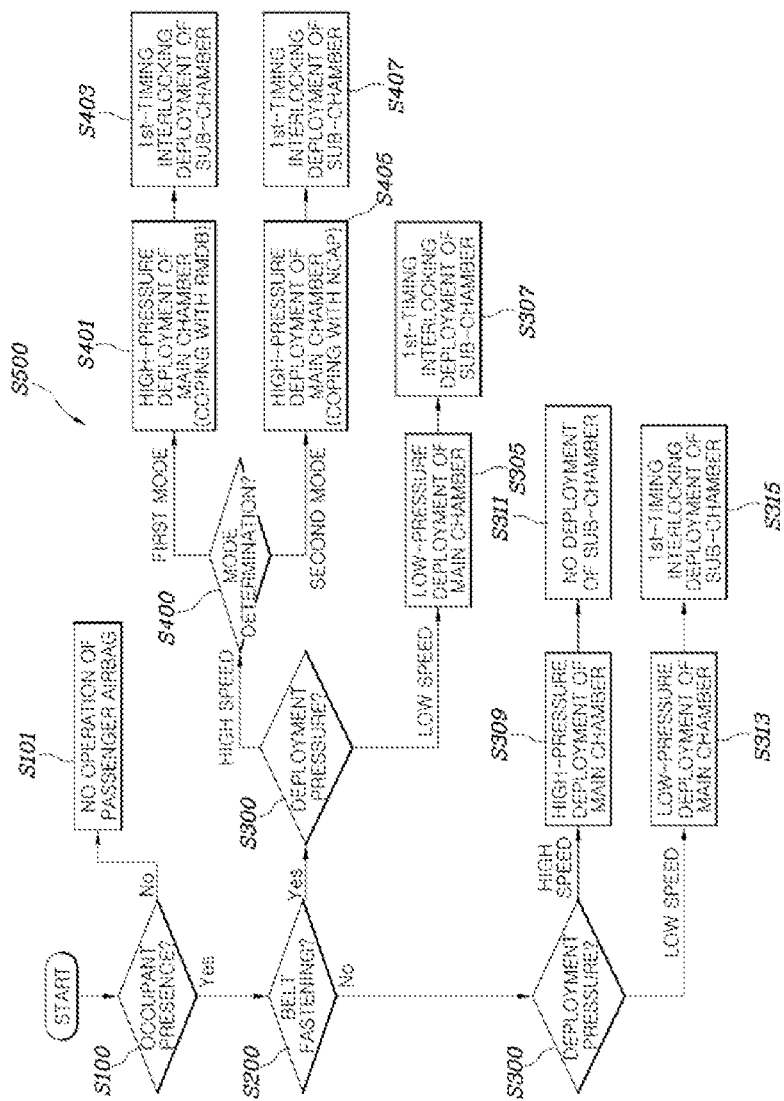
FIG. 3 is a flowchart showing a method for controlling a passenger airbag according to yet another embodiment of the present invention.
Figure 4:
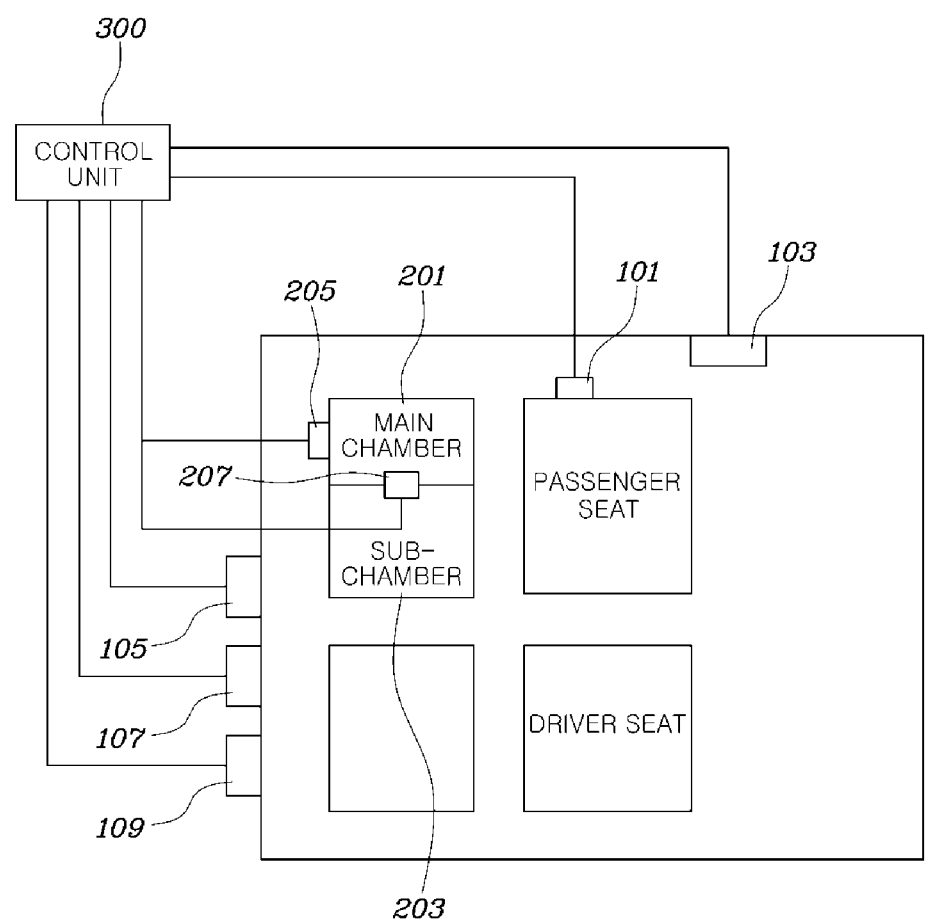
FIG. 4 is a view of the passenger airbag system according to the embodiment of the present invention.
Figure 5:
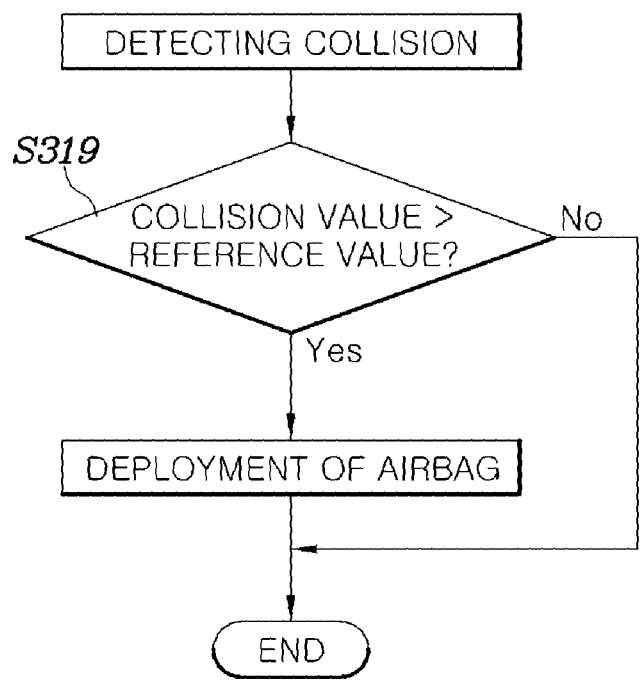
FIG. 5 is a flowchart showing a deployment determination control method using a collision sensor in the passenger airbag control method according to the embodiment of the present invention.
Figure 6:
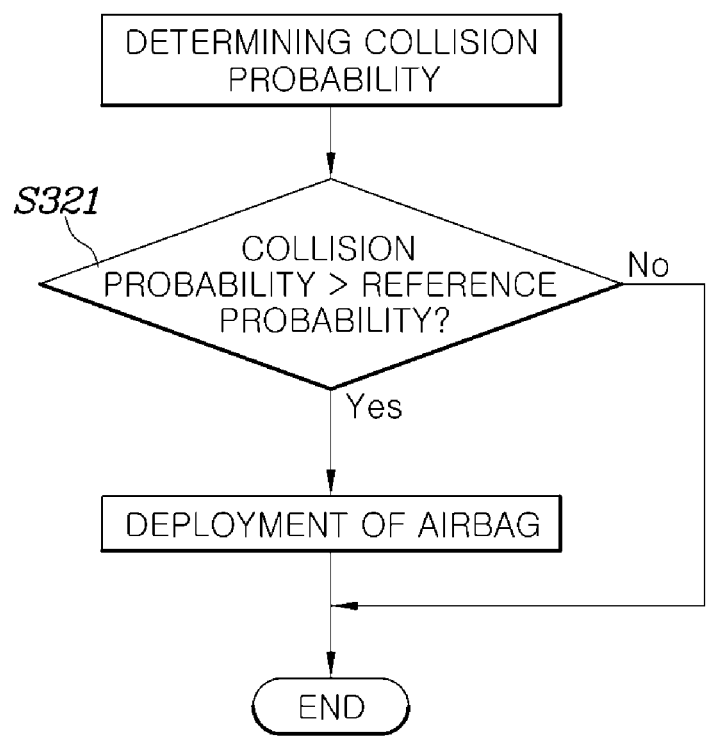
FIG. 6 is a flowchart showing a deployment determination control method using a pre-crash system in the passenger airbag control method according to the embodiment of the present invention.

FIG. 1 is a flowchart showing a method for controlling a passenger airbag according to an embodiment of the present invention. FIGS. 2 and 3 are flowcharts showing methods for controlling passenger airbags according to other embodiments of the present invention. FIG. 4 is a view of the passenger airbag system according to the embodiment of the present invention. FIG. 5 is a flowchart showing a deployment determination control method using a collision sensor in the method for controlling the passenger airbag according to the embodiment of the present invention. FIG. 6 is a flowchart showing a deployment determination control method using a free crash system 107, 109 and 300 in the method for controlling the passenger airbag according to the embodiment of the present invention.

The passenger airbag control method according to the embodiment of the present invention includes: an occupant presence determination step (S100) of determining whether an occupant is present on a passenger seat; a belt fastening determination step (S200) of determining whether the occupant seated on the passenger seat has fastened a safety belt; a deployment determination step (S300) of determining whether deployment of a passenger airbag is required; and a deployment step (S500) of, when the deployment of the passenger airbag is required, deploying a main chamber 201 of the passenger airbag and also deploying a sub-chamber 203 connected to the main chamber 201 of the passenger airbag to be interlocked with the deployment of the main chamber 201 if the occupant is present on the passenger seat and has fastened the safety belt.

In the deployment determination step (S300), whether deployment of the passenger airbag is required is determined by using a collision sensor, which directly detects a collision of the vehicle, or using a pre-crash system 107, 109 and 300, which predicts a collision with another vehicle. In detail, referring to FIGS. 5 and 6, at the deployment determination step (S300), if a collision value sensed by the collision sensor is greater than a reference value, it may be determined that deployment of the airbag is required. Alternatively, it may be determined that, when the pre-crash system predicts a vehicle collision and a predicted collision probability is a predetermined reference value or more, deployment of the airbag is required.

The collision value sensed by the collision sensor may be a speed of the vehicle when the collision occurs or an acceleration value of pulse generated by the collision. The use of the pre-crash system, which predicts in advance whether deployment of the airbag is required and controls the airbag, is advantageous in that the airbag can be deployed in advance of a collision and the safety of the occupant can be more reliably promoted, compared to the use of the collision sensor which controls the airbag after the collision occurs. A detailed passenger airbag control method, which is performed after the pre-crash system has determined that deployment of the airbag is required, is the same as that when using the collision sensor.

The deployment step (S500) includes steps (S301, S303, S305, S307, S309, S311, S313, S315 and S317).

At the passenger presence determination step (S100), it is determined whether an occupant is present on the passenger seat. At the belt fastening determination step (S200), it is determined whether the occupant on the passenger seat has fastened the safety belt. At the deployment determination step (S300), it is determined whether deployment of the passenger airbag is required. At the deployment step (S500), when deployment of the passenger airbag is required, the main chamber 201 of the passenger airbag is deployed and the sub-chamber 203 connected to the main chamber 201 of the passenger airbag is also deployed to be interlocked with the deployment of the main chamber 201 if the occupant is present on the passenger seat and has fastened the safety belt.

In the case of the airbag control method and system according to the conventional technique, one of the most significant problems caused when an RMDB collision occurs is that the occupant on the passenger seat comes into hard contact with a vehicle body. In detail, in the case where a three-point fixed safety belt is used as the safety belt of the passenger seat, when the occupant on the passenger seat is leaned forward by a collision, only one shoulder of the occupant is fixed in place by the safety belt, and thus the upper body of the occupant is biased in the direction pertaining to the other unfixed shoulder. In this case, the occupant may be displaced out of a range within which the main chamber 201 of the passenger airbag can protect the occupant, and be brought into hard contact with a center fascia of the vehicle.

Referring to FIG. 1, in the passenger airbag control method according to present invention, if the occupant is present on the passenger seat and has fastened the safety belt when a vehicle collision is sensed, the main chamber 201 and the sub-chamber 203 of the passenger airbag are deployed together to be interlocked with each other so that the sub-chamber 203 can prevent the occupant from coming into hard contact with the center fascia of the vehicle.

At the deployment determination step (S300), a collision speed of the vehicle is determined, and it is determined whether the collision is a high-speed collision or a low-speed collision. At the deployment step (S500), if the collision is determined as being the high-speed collision, the main chamber 201 of the passenger airbag is deployed at high pressure (at S301 or S309). If the collision is determined as being the low-speed collision, the main chamber 201 of the passenger airbag is deployed at low pressure (at S305 or S313).

Referring to FIG. 1, in the passenger airbag control method according to the present invention, when the vehicle is involved in a high-speed collision, the main chamber 201 of the passenger airbag is rapidly deployed at high pressure (at S301 or S309) in consideration of the fact that the upper body of the occupant on the passenger seat leans forward at high speed. Thereby, the occupant can be prevented from coming into hard contact with the vehicle body. When the vehicle is involved in a low-speed collision, at step (S305 or S313), the main chamber 201 is deployed at low pressure at a speed lower than that in the high-speed collision. Thereby, impulse applied to the occupant by the pressure of deployment of the airbag can be reduced.

At the deployment step (S500), although the deployment of the passenger airbag is required, the passenger airbag may not be operated if no occupant is present on the passenger seat (at S101).

In the case where no occupant is present on the passenger seat, the passenger airbag is prevented from being deployed. Thus, the passenger airbag, which is a consumable element, can be prevented from being unnecessarily consumed.

At the deployment step (S500), when the deployment of the passenger airbag is required, if the occupant is present on the passenger seat and has not fastened the safety belt, only the main chamber 201 of the passenger airbag may be deployed but the sub-chamber 203 may not be deployed.

This will be explained in more detail with reference to FIG. 1. If the occupant on the passenger seat has not fastened the safety belt, the degree with which the upper body of the occupant is biased toward the center fascia when a collision occurs is reduced. Therefore, the probability at which the occupant on the passenger seat comes into hard contact with the center fascia is reduced. Given this, there is no need for deploying the sub-chamber 203 of the passenger airbag (at S311 or S315), while the pressure at which the main chamber 201 is deployed has only to be controlled (at S309 or S313).

At the deployment step (S500), when the deployment of the passenger airbag is required, if the occupant on the passenger seat has not fastened the safety belt and it is determined that the collision is a low-speed collision, the main chamber 201 of the passenger airbag may be deployed at low pressure, and the sub-chamber 203 may be deployed (S317).

This is to comply with low risk deployment (LRD) regulations. In the conventional technique, a separate LRD vent structure is provided at a predetermined position in the main chamber 201 so that when the main chamber 201 is deployed, internal air is discharged out of the main chamber 201 through the LRD vent. As such, the conventional technique is configured such that the pressure of deployment of the main chamber 201 is adjusted through the LRD vent, thus preventing the occupant from being injured by high deployment pressure of the main chamber 201. However, the use of the separate LRD vent structure makes the operation of housing the airbag in an airbag housing difficult and increases the production cost and the weight of the product. In addition, because of a complex tether structure in the airbag housing, there is the possibility of a problem in operability.

Referring to FIG. 2, in the present invention, the main chamber 201 and the sub-chamber 203 are connected to each other through an active vent without using the conventional LRD vent structure so that when the vehicle is involved in a low-speed collision, pressure applied to the main chamber 201 is dispersed to the sub-chamber 203 (at S317), thus complying with the LRD regulations. Thereby, the present invention solves the conventional problems of difficulty in housing the airbag in the airbag housing, increases in the production cost or the weight, and deterioration in the operability because of the complex tether structure.

The main chamber 201 is deployed by two-stage explosion of an inflator 205 which are selectively conducted. At the deployment step (S500), the sub-chamber 203 may be deployed in response to a first explosion timing of the inflator 205 for the main chamber 201.

According to the embodiment of FIG. 2, a timing at which the sub-chamber 203 is deployed is connected with the first explosion timing of the two explosion timings in the two-stage explosion of the inflator 205 (at S303, S307 or S317). Thereby, responding to a collision, the sub-chamber 203 can be more rapidly operated to safely protect the occupant on the passenger seat.

After the deployment determination step (S300), the passenger airbag control method may further include a mode determination step (S400) of determining whether the collision pertains to a first mode (S401 and S403) or a second mode (S405 and S407) using an acceleration value of pulse detected when the collision occurs.

Referring to FIG. 3, the first mode (S401 and S403) is a mode for coping with RMDB collision conditions, and the second mode (S405 and S407) is a mode for coping with new car assessment program (NCAP) collision conditions. The modes can be distinguished from each other by analyzing an acceleration value of pulse detected when the collision occurs. Although detailed numerical values change depending on the size, weight, structure, etc. of the vehicle, an acceleration value of pulse generated in the RMDB collision is higher than that generated in the NCAP collision, in the case of the same kind of vehicle.

Given this, when a collision occurs, whether the collision pertains to RMDB collision conditions or NCAP collision conditions is determined by analyzing pulse generated in the collision. Depending on this, pressure and timing at which the passenger airbag is deployed are adjusted in such a way that the deployment speed of the main chamber 201 of the passenger airbag in the RMDB collision conditions is higher than that in the NCAP collision conditions. Thereby, the safety of the occupant on the passenger seat can be more reliably ensured.

A method for controlling a passenger airbag according to an embodiment of the present invention may include: an occupant presence determination step (S100) by a control unit 300, i.e., a controller 300, of determining whether an occupant is present on a passenger seat using an occupant detection sensor 101; a belt fastening determination step (S200) of, by the control unit 300, of determining whether the occupant on the passenger seat has fastened a safety belt using a belt fastening detection sensor 103; a deployment determination step (S300) of, by the control unit 300, determining whether deployment of the passenger airbag is required depending on a value measured by a collision sensor 105 or a result of collision prediction using a pre-crash system 107, 109 and 300; and a deployment step (S500) of, by the control unit 300, when the deployment of the passenger airbag is required, controlling an inflator 205 of the passenger airbag and deploying a main chamber 201 of the passenger airbag and also deploying a sub-chamber 203 connected to the main chamber 201 of the passenger airbag to be interlocked with the deployment of the main chamber 201 if the occupant is present on the passenger seat and has fastened the safety belt. The main chamber 201 and the sub-chamber 203 are configured such that they communicate with each other when an actuator 207 is operated. In the deployment step (S500), the actuator 207 may be operated in response to control of the operation of the inflator 205.

According to the present embodiment, in the occupant presence determination step (S100), the belt fastening determination step (S200), the deployment determination step (S300) and the deployment step (S500), the sensors corresponding to the conditions of the respective steps are used. The sensors are connected to the control unit 300. The control unit 300 collects information obtained from the sensors and controls whether deployment of the passenger airbag is required, the pressure at which the main chamber 201 is deployed, whether deployment of the sub-chamber 203 is required, etc. Therefore, the present embodiment can rapidly and effectively cope with various collision conditions.

An passenger airbag system according to an embodiment of the present invention includes: an occupant detection sensor 101 which detects whether an occupant is present on a passenger seat; a belt fastening detection sensor 103 which detects whether the occupant has fastened a safety belt; a collision sensor 105 which detects a collision of the vehicle; a main chamber 201 which is provided in front of the occupant on the passenger seat; a sub-chamber 203 which is connected to the main chamber 201; and a control unit 300, i.e., a controller 300, which controls the main chamber 201 and the sub-chamber 203 such that when the deployment of the passenger airbag is required, the main chamber 201 of the passenger airbag is deployed, and the sub-chamber 203 connected to the main chamber 201 is also deployed to be interlocked with the deployment of the main chamber 201 if the occupant is present on the passenger seat and has fastened the safety belt.

The occupant detection sensor 101 of the passenger airbag system according to the present embodiment detects whether an occupant is present on the passenger seat. The belt fastening detection sensor 103 detects whether the occupant has fastened the safety belt. The collision sensor 105 detects a collision of the vehicle. The main chamber 201 is provided in front of the occupant on the passenger seat. The sub-chamber 203 is configured to be connected to the main chamber 201. The control unit 300 controls whether deployment of each of the main chamber 201 and the sub-chamber 203 is required based on information obtained from the occupant detection sensor 101, the belt fastening detection sensor 103 and the collision sensor 105.

In the passenger airbag system according to the present embodiment, the sensors, and the main chamber 201 and sub-chamber 203 of the passenger seat are controlled to be interlocked with each other by the control unit 300. Therefore, the passenger airbag system can rapidly and effectively cope with various collision conditions.

Another embodiment of the passenger airbag system for performing the passenger airbag control method of the present invention includes an occupant detection sensor which detects whether an occupant is present on a passenger seat; a belt fastening detection sensor which detects whether the occupant has fastened a safety belt; a pre-crash system 107, 109 and 300 which predicts a collision of the vehicle with another vehicle; a main chamber which is provided in front of the occupant on the passenger seat; a sub-chamber which is connected to the main chamber; and a control unit, i.e., a controller, which controls the main chamber and the sub-chamber such that when the collision with the another vehicle is predicted by the pre-crash system 107, 109 and 300, the main chamber of the passenger airbag is deployed, and the sub-chamber connected to the main chamber is also deployed to be interlocked with the deployment of the main chamber if the occupant is present on the passenger seat and has fastened the safety belt.

The pre-crash system 107, 109 and 300 includes a camera 107 and a radar 109 which are used to obtain information about the target vehicle, and a control unit, i.e., a controller, which controls the camera 107 and the radar 109.

The collision value sensed by the collision sensor may be a speed of the vehicle when the collision occurs or an acceleration of pulse generated by the collision. The use of the pre-crash system 107, 109 and 300, which predicts in advance whether deployment of the airbag is required and controls the airbag, is advantageous in that the airbag can be deployed in advance of a collision and the safety of the passenger can be more reliably promoted, compared to the use of the collision sensor which controls the airbag after the collision occurs.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling a passenger airbag, comprising:
   determining whether an occupant is present on a passenger seat;
   determining whether the occupant seated on the passenger seat has fastened a safety belt;
   determining whether deployment of the passenger airbag is required;
   determining whether a collision pertains to a first mode or to a second mode using an acceleration value of pulse detected when the collision occurs; and
   deploying, when the deployment of the passenger airbag is required based on the determined first or second mode, a main chamber of the passenger airbag, and further deploying a sub-chamber connected to the main chamber of the passenger airbag to be interlocked with the deployment of the main chamber when the occupant is present on the passenger seat and has fastened the safety belt,
   wherein the first mode is a mode for coping with research moving deformable barrier (RMDB) collision conditions and the second mode is a mode for coping with new car assessment program (NCAP) collision conditions,
   wherein an acceleration value of pulse detected in the first mode is higher than an acceleration value detected in the second mode, and
   wherein at least one of pressure and timing at which the passenger airbag is deployed is adjusted in such a way that a deployment speed of the main chamber of the passenger airbag in the first mode is higher than a deployment speed in the second mode.

2. The method according to claim 1, wherein the determining of whether the deployment is required comprises determining a collision speed of a vehicle, and determining whether the collision is a high-speed collision or a low-speed collision, and
   the deploying comprises deploying the main chamber of the passenger airbag at a high pressure when the collision is determined as being the high-speed collision, and deploying the main chamber of the passenger airbag at a low pressure when the collision is determined as being the low-speed collision.

3. The method according to claim 1, wherein in the deploying, when the deployment of the passenger airbag is required, and when no occupant is present on the passenger seat, the passenger airbag is not operated.

4. The method according to claim 1, wherein in the deploying, when the deployment of the passenger airbag is required, and when the occupant is present on the passenger seat and has not fastened the safety belt, the main chamber of the passenger airbag is deployed and the sub-chamber is not deployed.

5. The method according to claim 2, wherein in the deploying, when the deployment of the passenger airbag is required, and when the occupant is present on the passenger seat and has not fastened the safety belt and the collision is determined as being the low-speed collision, the main chamber of the passenger airbag is deployed at a low pressure and the sub-chamber is deployed.

6. The method according to claim 1, wherein
   the main chamber is deployed by two-stage explosion of an inflator which are selectively conducted, and
   the deploying comprises deploying the sub-chamber to be interlocked with a first explosion timing of the inflator of the main chamber.

7. A method for controlling a passenger airbag, comprising:
   determining, by a controller, whether an occupant is present on a passenger seat using an occupant detection sensor;
   determining, by the controller, whether the occupant seated on the passenger seat has fastened a safety belt using a belt fastening detection sensor;
   determining, by the controller, whether deployment of the passenger airbag is required depending on a value measured by a collision sensor or a result of collision prediction using a pre-crash system;
   determining, by the controller, whether a collision pertains to a first mode or to a second mode using an acceleration value of pulse detected when the collision occurs; and
   controlling, by the controller, when the deployment of the passenger airbag is required based on the determined first or second mode, operation of an inflator of the passenger airbag and deploying a main chamber of the passenger airbag, and further deploying a sub-chamber connected to the main chamber of the passenger airbag to be interlocked with the deployment of the main chamber when the occupant is present on the passenger seat and has fastened the safety belt,
   wherein the first mode is a mode for coping with research moving deformable barrier (RMDB) collision conditions and the second mode is a mode for coping with new car assessment program (NCAP) collision conditions, an acceleration value of pulse detected in the first mode is higher than an acceleration value detected in the second mode, and wherein the controller adjusts at least one of pressure and timing at which the passenger airbag is deployed in such a way that a deployment speed of the main chamber of the passenger airbag in the first mode is higher than a deployment speed in the second mode.

8. The method according to claim 7, wherein the main chamber and the sub-chamber are configured to communicate with each other when an actuator is operated, and the deploying of the sub-chamber comprises operating the actuator to be interlocked with the controlling of the operation of the inflator.

9. A passenger airbag system for conducting the method of claim 1, comprising:

an occupant detection sensor detecting whether the occupant is present on the passenger seat;

a belt fastening detection sensor detecting whether the occupant has fastened the safety belt;

a collision sensor detecting the collision of a vehicle;

the main chamber provided in front of the occupant seated on the passenger seat;

the sub-chamber connected to the main chamber; and a controller controlling the main chamber and the sub-chamber such that when a collision signal is detected, the main chamber of the passenger airbag is deployed, and the sub-chamber connected to the main chamber is further deployed to be interlocked with the deployment of the main chamber when the occupant is present on the passenger seat and has fastened the safety belt.

10. A passenger airbag system for conducting the method of claim 1, comprising:

a detection sensor detecting whether the occupant is present on the passenger seat;

a belt fastening detection sensor detecting whether the occupant has fastened the safety belt;

a pre-crash system predicting a collision with another vehicle;

the main chamber provided in front of the occupant seated on the passenger seat;

the sub-chamber connected to the main chamber; and a controller controlling the main chamber and the sub-chamber such that when the collision with the another vehicle is predicted by the pre-crash system, the main chamber of the passenger airbag is deployed, and the sub-chamber connected to the main chamber is further deployed to be interlocked with the deployment of the main chamber when the occupant is present on the passenger seat and has fastened the safety belt.

* * * * *